United States Patent Office 3,426,055
Patented Feb. 4, 1969

3,426,055
PHENYL MERCURY SULFUR COMPOUNDS
Elliott L. Weinberg, East Brunswick, N.J., assignor to Cosan Chemical Corporation, Clifton, N.J., a corporation of New Jersey
No Drawing. Filed Dec. 22, 1965, Ser. No. 515,722
U.S. Cl. 260—433
Int. Cl. C07f 3/10
4 Claims The present invention relates to new germicidal organo-mercury compounds, and more particularly to new organo-mercury sulfur compounds which are germicidal and can be incorporated into coating compositions including paints so as to provide a germicidal action.

Many organo-mercury compounds are used in paints and other coatings to render the coating resistant to the action of fungi, bacteria and mildew. However, in general, the known organo-mercury compounds which are active against microorganisms such as germs, bacteria, fungi, mildew, etc., are difficult to handle because they cause blistering and other irritations on the skin. Moreover, the coatings incorporating most organomercurials become dark-stained in environments which include sulfur-carrying gases. Another cause of discoloration of such coatings is decomposition of the mercury compound by sunlight.

It is accordingly a primary object of the present invention to provide organo-mercury compounds which are effective against many different types of microorganisms and which do not darken coating compositions or paints in which they are incorporated when exposed to sulfur-carrying gases or sunlight.

It is a further object of the present invention to provide new organo-mercury compounds which are active against microorganisms but which do not possess the undesired vesicant action usually associated with organo-mercury compounds. The compounds of the present invention while having a high degree of microbiological activity are relatively harmless to human skin.

It is still another object of the present invention to provide germicidal organo-mercury compounds which are relatively water-insoluble and can be incorporated into all types of coating compositions, including paints, and which are not subject to excessive leaching from the coating.

Other objects and advantages of the present invention will be apparent from a further reading of the specification and of the appended claims.

With the above and other objects in view, the present invention mainly comprises an organo-mercury compound of the formula:

Ar—Hg—S—R wherein Ar is an aromatic residue and wherein R is selected from the group consisting of alkaryl, aralkyl and alkyl.

The non-irritating nature of these compounds allows for the grinding thereof into coating compositions such as paints along with other solids. An alternative method of combining these compounds in the coating composition is to disperse the same in an oil and to blend the oil into the paint or coating formulation.

The compounds of the present invention may be produced by reacting the corresponding aromatic mercury compound of the formula:

Ar—Hg—X wherein Ar has the same definition as above and wherein X provides an active oxygen function such as —OH, —OOCCH₃, etc., with the selected sulfhydryl compound, such as lauryl mercaptan, mercapto-ethanol and esters thereof, mercapto-acetic acid and esters thereof, 4-t-butyl thiophenol, benzyl mercaptan, p-dodecyl benzyl mercaptan, etc.

The following examples are given to further illustrate the method of producing the compounds according to the invention. The scope of the invention is not, however, meant to be limited to the specific details of the examples.

EXAMPLE 1

Phenyl mercuric hydroxide (0.1 mol, 29.5 gm.) is added with agitation to 4-nonyl thiophenol (0.1 mol, 23.6 gm.). An exothermic reaction takes place causing a temperature rise from room temperature to 65° C. The mixture is heated to 120° C. to remove water of reaction. The yield is theoretical. The product is soluble to the extent of 50% in xylene.

EXAMPLE 2

The procedure of Example 1, is repeated using 4-t-butyl thiophenol (0.1 mol, 16.6 gm.).

EXAMPLE 3

The procedure of Example 1, is repeated using benzyl mercaptan (0.1 mol, 124 gm.).

EXAMPLE 4

Lauryl mercaptan (0.1 mol, 20.8 gm.) is added to phenyl mercuric acetate solution in benzene-acetic acid (168.5 gm. of 20% solution). A white precipitate of phenyl mercury lauryl mercaptide is formed and is recovered by filtration. Additional product is recovered by vacuum stripping of the filtrate. A total yield of 95% is obtained.

EXAMPLE 5

The procedure of Example 1, is repeated using mercapto-ethanol (0.1 mol, 7.8 gm.).

The compounds of the present invention were tested to determine their anti-mildew activity as follows:

The various substances listed in the above examples were compounded at 0.18% and 0.018% mercury metal levels in two typical oil-based house paints of the following composition:

| Pigment 62% | | Vehicle 38% | |
|---|---|---|---|
| Titanium dioxide | 29.8% | Fortified Linseed Oil | 73.5% |
| Leaded zinc oxide | 38.6% | Thinner & Driers | 26.5% |
| Magnesium silicate | 31.6% | Less than 5% Tinting Color | |
| | 100.0% | | 100.0% |

The various paint preparations were brush coated on filter paper, two coats on one side, with drying between coats. Squares, 1¼" on a side, were surface sterilized and aseptically placed on agar medium previously seeded with a spore suspension of the fungus, Pullularia pullulans. The exposed samples were incubated for four weeks at 28–30° C.

The tests results were as follows:

| Sample | Level | Four Week Incubation Result |
|---|---|---|
| Ex. 1—Phenyl mercury 4-nonyl thiophenate. | Low | Zone of inhibition, 2 mm. |
| | High | Zone of inhibition, 15 mm. |
| Ex. 2—Phenyl mercury 4-t-butyl thiophenate. | Low | Zone of inhibition, 3 mm. |
| | High | Zone of inhibition, 13 mm. |
| Ex. 3—Phenyl mercury benzyl mercaptide. | Low | Zone on inhibition, 2-4 mm. |
| | High | Zone of inhibition, 12-14 mm. |
| Ex. 4—Phenyl mercury lauryl mercaptide. | Low | Zone of inhibition, 2 mm. |
| | High | Zone of inhibition, 11 mm. |
| Phenyl mercury oleate (commercial). | Low | Zone of inhibition, 3 mm. |
| | High | Zone of inhibition, 14 mm. |
| Untreated control | | Dense, almost complete fungal growth. |

Using a commercial latex house paint, the compounds of various examples were examined for mildew resistance at a mercury level of 0.18%. The results were as follows:

| Sample | Four Week Incubation Result |
|---|---|
| Ex. 1—Phenyl mercury 4-nonyl thiophenate. | Zone of inhibition 5 mm. |
| Ex. 2—Phenyl mercury 4-t-butyl thiophenate. | Zone of inhibition 2 mm. |
| Ex. 3—Phenyl mercury benzyl mercaptide. | Zone of inhibition 3 mm. |
| Ex. 4—Phenyl mercury lauryl mercaptide. | Zone of inhibition 7 mm. |
| Ex. 5—Phenyl mercury mercaptoethanol. | Zone of inhibition 17 mm. |
| Phenyl mercury acetate (commercial). | Zone of inhibition 12 mm. |
| Untreated control | Dense, almost complete fungal growth. |

The anti-bacterial activity of the compounds of the invention were also determined as follows:

Using a commercial latex house paint, bacterial stability was determined at a mercury level of 0.018%. The test procedure was as follows:

Various agents were incorporated in the untreated paint and these paint samples were inoculated with a mixed bacterial culture. At time intervals of twenty-four hours and seven days, samples of the paints were streaked on agar plates to determine survival, if any, of the inoculum. The results were as follows:

| Sample | Bacterial growths | |
|---|---|---|
| | 24 hrs. | 7 days |
| Ex. 1—Phenyl mercury 4-nonyl thipohenate | Trace | Trace. |
| Ex. 2—Phenyl mercury 4-t-butyl thiophenate | Trace | No. |
| Ex. 3—Phenyl mercury benzyl mercaptide | No | No. |
| Ex. 4—Phenyl mercury lauryl mercaptide | Trace | No. |
| Ex. 5—Phenyl mercury mercaptoethanol | No | No. |
| Phenyl mercury acetate (commercial) | No | No. |
| Untreated control | Heavy | Heavy. |

Sulfide Stain Resistance of Treated Paint

Various test strips prepared as in the biological testing were exposed when fresh to high humidity and hydrogen sulfide gas. The results are reported for a latex paint at 0.18% mercury metal.

| Sample | Degree of stain |
|---|---|
| Ex. 1—Phenyl mercury 4-nonyl thiophenate | Light grey |
| Ex. 2—Phenyl mercury 4-t-butyl thiophenate | Light grey |
| Ex. 3—Phenyl mercury benzyl mercaptide | White |
| Ex. 4—Phenyl mercury lauryl mercaptide | White |
| Ex. 5—Phenyl mercury mercaptoethanol | Dark grey |
| Phenyl mercury acetate (commercial) | Dark grey |
| Untreated control | White |

While the invention has been described in particular with respect to certain compounds in certain tests concerning these compounds, it is to be understood that variations and modifications can be made without departing from the spirit or scope of the invention. Such variations and modifications are meant to be comprehended within the range and scope of equivalence of the appended claims.

What is claimed as new and desired to be secured by Letters Patent is:

1. An organo-mercury compound of the group consisting of phenyl mercury 4-nonyl thiophenate, phenyl mercury 4-t-butyl thiophenate, and phenyl mercury mercaptoethanol.

2. An organo-mercury compound according to claim 1, said compound being phenyl mercury 4-nonyl thiophenate.

3. An organo-mercury compound according to claim 1, said compound being phenyl mercury 4-t-butyl thiophenate.

4. An organo-mercury compound according to claim 1, said compound being phenyl mercury mercapto-ethanol.

References Cited

UNITED STATES PATENTS

| | | | |
|---|---|---|---|
| 2,471,621 | 5/1949 | Hartmann et al. | 260—433 XR |
| 2,779,703 | 1/1957 | Crouch et al. | 260—431 XR |
| 2,883,407 | 4/1959 | Flenner | 260—431 |
| 2,883,409 | 4/1959 | Flenner | 260—433 XR |

FOREIGN PATENTS 634,147  1/1962  Canada.

OTHER REFERENCES

I Chemical Abstracts, vol. 18, p. 57 (1924).
II Chemical Abstracts, vol. 47, p. 111h (1953).
III Chemical Abstracts, vol. 56, p. 15530g (1962).
IV Chemical Abstracts, vol. 54, p. 17041i–17042b (1960).

HELEN M. McCARTHY, *Primary Examiner.*

H. M. S. SNEED, *Assistant Examiner.*

U.S. Cl. X.R.

260—431, 999